US008989317B1

(12) United States Patent
Holden et al.

(10) Patent No.: US 8,989,317 B1
(45) Date of Patent: Mar. 24, 2015

(54) CROSSBAR SWITCH DECODER FOR VECTOR SIGNALING CODES

(71) Applicant: Kandou Labs SA, Lausanne (CH)

(72) Inventors: Brian Holden, Monte Sereno, CA (US); Amin Shokrollahi, Préverenges (CH)

(73) Assignee: Kandou Labs, S.A. (CH)

( * ) Notice: Subject to any disclaimer, the term of this patent is extended or adjusted under 35 U.S.C. 154(b) by 37 days.

(21) Appl. No.: 13/671,426

(22) Filed: Nov. 7, 2012

(51) Int. Cl.
*H04L 27/06* (2006.01)

(52) U.S. Cl.
USPC ........... 375/340; 375/295; 375/316; 375/320; 375/330; 375/345

(58) Field of Classification Search
CPC ..... G06F 7/24; G06F 15/8015; G02B 6/4249; H04L 49/101; H02M 3/33515; H02M 3/33576; H02M 2001/008; H03K 3/356121; H03K 3/35613; H03K 7/08; H03M 1/363; H02J 13/0003; H02J 13/0062; H02J 1/08; H04Q 3/0004; H04W 84/02
USPC ......... 375/259, 262, 295, 299, 316, 320, 328, 375/330, 332, 337, 340, 342, 344, 345, 346, 375/350
See application file for complete search history.

(56) References Cited

U.S. PATENT DOCUMENTS

| 4,811,210 | A  | * | 3/1989 | McAulay ..................... 710/317 |
| 6,175,230 | B1 | * | 1/2001 | Hamblin et al. ......... 324/763.01 |
| 6,661,355 | B2 |   | 12/2003 | Cornelius et al. |
| 7,239,650 | B2 | * | 7/2007 | Rakib et al. .................... 370/480 |
| 7,486,726 | B2 | * | 2/2009 | Alexander et al. ............ 375/232 |
| 2004/0225787 | A1 | * | 11/2004 | Ma et al. ........................ 710/260 |
| 2007/0040657 | A1 | * | 2/2007 | Fosler et al. .................. 340/333 |
| 2008/0104374 | A1 | * | 5/2008 | Mohamed ...................... 712/220 |
| 2009/0185636 | A1 |   | 7/2009 | Palotai et al. |
| 2010/0205506 | A1 |   | 8/2010 | Hara |
| 2011/0268225 | A1 | * | 11/2011 | Cronie et al. ................. 375/296 |
| 2011/0302478 | A1 | * | 12/2011 | Cronie et al. ................. 714/777 |
| 2013/0346663 | A1 | * | 12/2013 | Tell .............................. 710/305 |

FOREIGN PATENT DOCUMENTS

WO    2010/031824    3/2010

OTHER PUBLICATIONS

Abbasfar. A., "Generalized Differential Vector Signaling," *IEEE International Conference on Communications, ICC '09* (Jun. 14, 2009), pp. 1-5.
Dasilva et al., "Multicarrier Orthogonal CDMA Signals for Quasi-Synchronous Communication Systems," *IEEE Journal on Selected Areas in communications*, vol. 12, No. 5 (Jun. 1, 1994), pp. 842-852.

(Continued)

*Primary Examiner* — Hirdepal Singh
(74) *Attorney, Agent, or Firm* — Invention Mine LLC; Robert J. Irvine, III

(57) ABSTRACT

An efficient decoding of vector signaling codes is obtained using a circuit that ranks received signal levels, designates ranked values as representing particular code elements, and translates those particular code elements into a decoded result. An optimized ranking circuit combines analog crossbar switching of signal values with comparators that provide digital results. These elements may be repetitively tiled into processing arrays capable of larger ranking operations, or iteratively applied to selected portions of the data set under control of a sequencer or controller.

19 Claims, 12 Drawing Sheets

(56) References Cited

OTHER PUBLICATIONS

Oh, et al. "Pseudo-Differential Vector Signaling for Noise Reduction in Single-Ended Signaling." [online] 2009 [retrieved on Jul. 24, 2012]. Retrieved from the Internet: <URL:http://www.rambus.com/assets/documents/events/090202_designcon_paper_oh.pdf>.

Slepian, D., "Permutation Modulation," *Proceedings of the IEEE*, vol. 53, No. 3 (1965), pp. 228-236.

Stan, et al. "Bus-Invert Coding for Low-Power I/O," *IEEE Transactions on VLSI Systems*, vol. 3, No. 1 (1995), pp. 49-50.

Tallini et al., "Transmission Time Analysis for the Parallel Asynchronous Communication Scheme," *IEEE Transactions on Computers*, vol. 52, No. 5 (2003), pp. 558-571.

Wang et al., "Applying CDMA Technique to Network-on-Chip," *IEEE Transactions on Very Large Scale Integration (VLSI) Systems*, vol. 15, No. 10 (Oct. 1, 2007), pp. 1091-1100.

\* cited by examiner

| Code | Code levels | Stages | Tile | Comparators needed | Specific comparisons made |
|---|---|---|---|---|---|
| 2.5b4w | +,+,-,- | 1 | 4x4 | 6 | Full |
| 2.5b4w | +,+,-,- | 2 | 2x2 | 4 | $1^{st}$:(0-3), (1-2); $2^{nd}$: (0,2), (1,3) |
| 3.5b4w | +,0,0,- | 1 | 4x4 | 6 | Full |
| 3.5b4w | +,0,0,- | 2 | 2x2 | 4 | $1^{st}$:(0-3), (1-2); $2^{nd}$: (0,1), (2,3) |
| 4b5w | +,0,0,0,- | 1 | Full | 10 | Full |
| 4b5w | +,0,0,0,- | 2 | 2x2 and 3x3 | 6 | $1^{st}$:(0,1,2-Full), (4-5); $2^{nd}$:(0-3), (2-3) |
| 4b5w | +,0,0,0,- | 4 | 2x2 | 6 | $1^{st}$:(0-3), (1-4); $2^{nd}$:(2-3); $3^{rd}$:(1-2); $4^{th}$:(0-1), (3-4) |
| 4b6w | +,+,+,-,-,- | 1 | Full | 15 | Full |
| 4b6w | +,+,+,-,-,- | 2 | 3x3 and 4x4 | 18 | $1^{st}$:(0,1,2-Full), (3,4,5-Full)<br>$1^{st}$- to $2^{nd}$ Wiring:(0-0),(1-1),(1-2),(2-3),(3-4),(4-5),(4-6),(5-7)<br>$2^{nd}$:(0,1,6,7-Full), (2,3,4,5-Full)<br>- are on 0, 1 and 2<br>+ are on 5, 6 and 7 |
| 4b6w | +,+,+,-,-,- | 3 | 2x2 | 9 | $1^{st}$:(0-5), (1-4), (2-3);<br>$2^{nd}$:(0-3), (1-5), (2-4);<br>$3^{rd}$:(0-4), (1-3), (2-5) |
| 6b6w | +,+,0,0,-,- | 1 | Full | 15 | Full |
| 6b6w | +,+,0,0,-,- | 2 | 3x3 and 4x4 | 18 | $1^{st}$:(0,1,2-Full), (3,4,5-Full)<br>$1^{st}$- to $2^{nd}$ Wiring:(0-0),(1-1),(1-2),(2-3),(3-4),(4-5),(4-6),(5-7)<br>$2^{nd}$:(0,1,4,5-Full), (2,3,6,7-Full)<br>- are on 0 and 1<br>0 are on any of 2,3,4, or 5<br>+ are on 6 and 7 |
| 6b6w | +,+,0,0,-,- | 4 | 2x2 | 11 | $1^{st}$:(0-5), (1-4), (2-3);<br>$2^{nd}$:(0-3), (1-5), (2-4);<br>$3^{rd}$:(1-2), (3-4);<br>$4^{th}$:(0-2), (1-4), (3-5) |
| 6b8w | +,+,+,+,-,-,-,- | 1 | Full | 28 | Full |
| 6b8w | +,+,+,+,-,-,-,- | 2 | 4x4 | 24 | $1^{st}$:(0,1,2,3-Full), (4,5,6,7-Full)<br>$2^{nd}$:(0,1,6,7-Full), (2,3,4,5-Full) |
| 6b8w | +,+,+,+,-,-,-,- | 4 | 2x2 | 16 | $1^{st}$:(0-7), (1-6), (2-5), (3-4);<br>$2^{nd}$:(0-6), (1-7), (2-4), (3-5);<br>$3^{rd}$:(0-5), (1-4), (2-7), (3-6);<br>$4^{th}$:(0-4), (1-5), (2-6), (3-7) |
| 8b8w | +,+,0,0,0,0,-,- | 1 | Full | 28 | Full |
| 8b8w | +,+,0,0,0,0,-,- | 2 | 4x4 | 24 | $1^{st}$:(0,1,2,3-Full), (4,5,6,7-Full)<br>$2^{nd}$:(0,1,4,5-Full), (2,3,6,7-Full) |
| 8b8w | +,+,0,0,0,0,-,- | 4 | 2x2 | 16 | $1^{st}$:(0-7), (1-6), (2-5), (3-4);<br>$2^{nd}$:(0-6), (1-7), (2-4), (3-5);<br>$3^{rd}$:(0-3), (1-2), (4-7), (5-6);<br>$4^{th}$:(0-2), (1-3), (4-6), (5-7) |

Figure 11

CROSSBAR SWITCH DECODER FOR VECTOR SIGNALING CODES

CROSS-REFERENCES TO RELATED APPLICATIONS

The following references are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication 2011/0302478 of application Ser. No. 12/982,777, filed Dec. 30, 2010, naming Harm Cronie and Amin Shokrollahi, entitled "Power and Pin Efficient Chip-to-Chip Communications with Common-Mode Rejection and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III");

U.S. patent application Ser. No. 13/176,657, filed Jul. 5, 2011, naming Harm Cronie and Amin Shokrollahi, entitled "Methods and Systems for Low-power and Pin-efficient Communications with Superposition Signaling Codes" (hereinafter "Cronie IV"); and U.S. patent application Ser. No. 13/542,599, filed Jul. 5, 2012, naming Armin Tajalli, Harm Cronie, and Amin Shokrollahi, entitled "Efficient Processing and Detection of Balanced Codes" (hereafter called "Tajalli").

BACKGROUND

In the use of communication links, a goal is to transport information from one physical location to another, sometimes over just a short distance between semiconductor devices. It is typically desirable that the transport of this information is reliable, is fast and consumes a minimal amount of resources. One of the most common information transfer mediums is the serial communications link, which may be based on a single wire circuit relative to ground or other common reference, multiple such circuits relative to ground or other common reference, or multiple circuits used in relation to each other.

In modern digital systems, it is desirable that digital information is processed in a reliable and efficient way. In this context, digital information is to be understood as information available in discrete, e.g., discontinuous, values. Bits, collection of bits, but also numbers from a finite set can be used to represent digital information.

The efficiency of digital communication systems can be expressed in terms of the time it takes to transfer certain amount of information (speed), the energy that is required to transmit the information reliably (power consumption) and, the number of wires or semiconductor device pins per bit that is required for communication (pin-efficiency). In many systems, several trade-offs exist between these parameters and, depending on the application, some of these parameters may be more important than others. In some chip-to-chip, or device-to-device communication systems, communication takes place over a plurality of wires to increase aggregate bandwidth. A single or pair of these wires may be referred to as a channel or link and multiple channels create a communication bus between the electronic components. At the physical circuitry level, in chip-to-chip communication systems, buses are typically made of electrical conductors in the package between chips and motherboards, on printed circuit boards ("PCBs") boards or in cables and connectors between PCBs. In high frequency applications, microstrip or stripline PCB traces are often used.

Common methods for transmitting signals over bus wires include single-ended and differential signaling methods. In applications requiring high speed communications, those methods can be further optimized in terms of power consumption and pin-efficiency, especially in high-speed communications. Vector signaling methods based on Permutation Modulation Codes, Sparse Modulation Codes, or Superposition Signaling Codes, as taught by Cronie II, Cronie III, and Cronie IV, respectively, have been proposed to further optimize the trade-offs between power consumption, pin efficiency and noise robustness of chip-to-chip communication systems. In those vector signaling systems, the digital information is transformed into a different representation space in the form of a vector codeword, CW, that is chosen in order to optimize the power consumption, pin-efficiency and speed trade-offs based on the transmission channel properties and communication system design constraints. Herein, this process is referred to as "encoding". At the receiver side, the received signals corresponding to the codeword CW are transformed back into the original digital information representation space. Herein, this process is referred to as "decoding".

Conventional approaches to decoding are inefficient, ineffective and/or have undesirable side effects or other drawbacks with respect to at least one significant use case. For example, some conventional approaches are not amenable to optimization over a wide range of performance and complexity constraints. In particular, some conventional approaches require analog-to-digital converter circuitry that is problematic for high-speed and/or low power applications.

Embodiments of the invention are directed toward solving these and other problems individually and collectively.

BRIEF SUMMARY

An efficient and effective vector signaling code decoder is provided. The vector signaling code decoder may include a sorting circuit, a voting circuit and a decoding circuit. The sorting circuit may include a crossbar switch and one or more comparators. The sorting circuit may be configured to rank at least a subset of values of an input vector signaling code. The voting circuit may be configured to designate ranked values as representing particular code elements. The decoding circuit may be configured to translate sets of particular code elements into a decoded vector signaling code result.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim

BRIEF DESCRIPTION OF THE DRAWINGS

FIG. 11 is a table summarizing a number of specific decoder configurations each in accordance with at least one embodiment of the invention.

DETAILED DESCRIPTION

Figure 1:
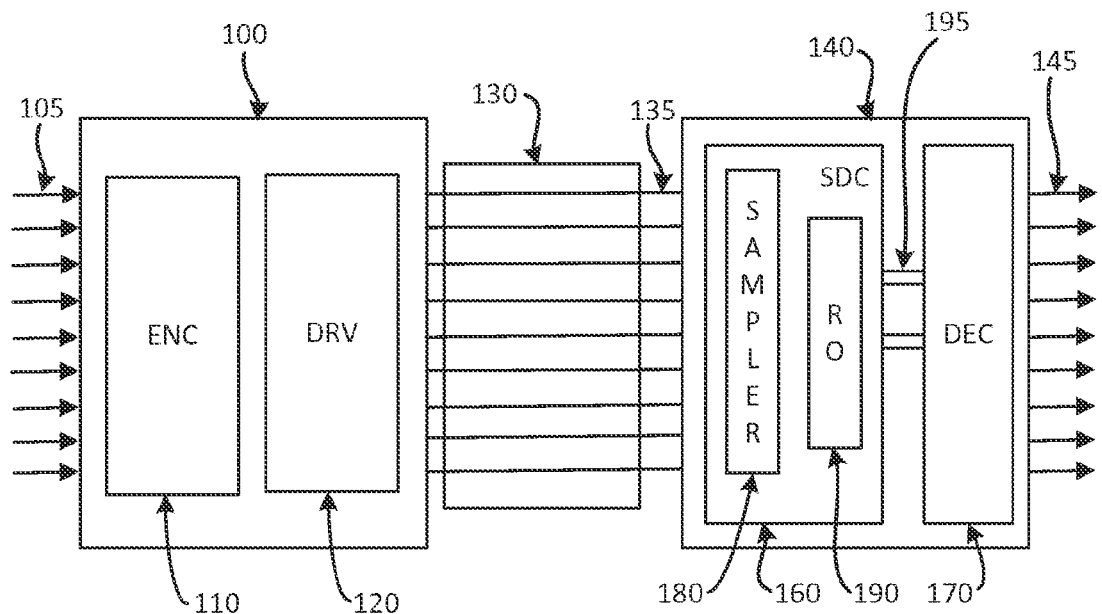
FIG. 1 is a high-level block diagram of a communication system as known in the prior art.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In accordance with at least one embodiment of the invention, a sorting decoder may determine encoded information carried by a vector signaling code at least in part by performing a full or partial ranking of input values corresponding to code elements. In accordance with at least one embodiment, a ranking is made of at least those inputs having non-quiescent values, and a voting circuit is used to designate ranked results as representing particular code elements of the vector signaling code. A decoding circuit translates the identified particular code elements into a decoded information result. In accordance with one or more alternate embodiments, larger subsets of input values or the entire input set may be ranked, combinatorial logic or a lookup table may be utilized to designate inputs as particular code elements, or the designation and decoding operations may be combined into a single step.

The ranking operation may be performed pairwise or in wider groupings across the set of input values. In accordance with at least one embodiment, a differential comparator that evaluates pairs of values and provides a digital comparison result, and an analog crossbar switch that orders or ranks the corresponding analog values for subsequent processing may be combined. Multiple such building block "tile" elements may be used to create multistage arrays where the partially sorted analog outputs of one stage become the inputs of the next stage, and the final stage may produce the desired ranked result over inputs. In accordance with at least one embodiment, this tile concept may be extended to wider input sets, for example tiles of four inputs, for use in arrays processing longer vector signaling codes, ranking larger sets of results, or requiring fewer or less complex processing stages. In accordance with at least one embodiment, the analog crossbar switch may be utilized to not only provide ordered analog output values, but also to select subsets of values for comparison by a fixed set of comparators, typically a significantly smaller set than required to pairwise compare all possible combinations of inputs. Under the control of a hardwired or programmable controller, different subsets of values are selected and compared using the same set or other sets of comparators and crossbar switch, much as the multiple stages of a tiled array iteratively processes partially sorted results to produce the desired ranked output. This is particularly useful when used with vector signaling codes that do not require a full ranking, but instead may be decoded if the inputs are grouped into sets.

The crossbar-based sorting decoder thus provides an implementation that is substantially more efficient than some other rank-ordering solutions, and amenable to optimization over a wide range of performance and complexity constraints. In particular, conventional analog-to-digital converter circuitry no longer needs to be integrated into the system design, and reference levels need not to be created as the comparisons are made relative to the other wires. It is thus particularly well suited to the design of power efficient chip-to-chip communications as well as more reliable memory systems, in particular, when used in association with vector signaling or vector storage applications to communication or memory systems respectively that are based on permutation codes. Moreover, as will be understood by one skilled in the art upon reading this disclosure, beyond its application to vector processing methods, the proposed sorting decoder circuit architecture is also generic enough to be applied to other digital signal processing applications where a set of analog signals need to be sorted prior to being processed in the digital domain.

FIG. 1 represents a high-level block diagram of a prior art communication system. At the transmit unit 100 side of the communication system, an encoder 110 transforms a sequence of k information symbols 105 into a vector codeword CW. A driver 120 maps vector codeword CW into a set of physical signals and transmits them on the n wires 135 of bus 130. Although FIG. 1 shows a number of lines for the k information symbols 105 and a number of wires 135, it should be understood that different values for k and n could be used and they need not be equal.

At the other side of bus 130, a receive unit 140 maps the n received physical signals from wires 135 back into k information symbols 145. Receive unit 140 includes a bus receiver in the form of a signal-to-digital converter ("SDC") 160 and a vector codeword decoder ("DEC") 170. In FIG. 1, a task of the SDC 160 is to reconstruct an estimate of the transmitted vector codeword CW from the analog signals transmitted and recorded over the n bus wires 135. SDC 160 then transmits the estimate of vector codeword CW to codeword decoder 170. Codeword decoder 170 can then reconstruct the k output bits by applying the reverse transformation from that of transmit encoder 110. SDC 160 is shown including a sampler 180 and a rank-order unit 190.

As an example, bus 130 may be a bus between a processor and memory. In that case, the physical wires may take the form of striplines or microstrips on a PCB. Another example of bus 130 may be a set of wires connecting two different devices. The system of FIG. 1 may also be extended to bi-directional communication settings. The information symbols may be bits, but other digital representations of information symbols as described above are also permissible.

Vector Processing

In this disclosure, we refer collectively to the methods disclosed in Cronie II, Cronie III, Cronie IV, and similar extensions as "vector processing" methods.

In accordance with the vector signaling teachings of Cronie II, Cronie III, and/or Cronie IV, at the transmitter side, in transmit unit 100, encoder 100 may include a vector signal encoder and driver 120 may include a bus driver. Transmit unit 100 processes the sequence of k information symbols 105 in a period T and thus takes in k new information symbols per period T. In accordance with at least one embodiment, T may be substantially smaller than one second and transmit unit 100 can transmit the information content of k/T symbols per second. In the l-th time interval of T seconds, the vector signal encoder maps these k bits to a vector $CW_l$ of size n. During the l-th symbol period of T seconds, the bus driver generates the vector s(t) of n continuous signals, $s_1(t)$ to $s_n(t)$, for each of the n bus wires 1, . . . , n in bus 135 as:

$$s(t) = CW_l * p(t) \quad \text{(Equation 1)}$$

where p(t) is a pulse shape signal.

Various vector signal encoders may be applied, where the vector $CW_l$ may be a codeword from a permutation modulation code, a sparse signaling code, a superposition signaling code, or another code of a vector signaling method. For instance, the methods taught by Cronie II, Cronie III, and/or Cronie IV may be used, as well as other methods known to those skilled in the art. A permutation modulation code or sparse signaling code $CW_l$ is defined by a basis vector, $x_0$, where the code includes the permutations of $x_0$. For the sake of illustration, we assume that the entries of $x_0$ are sorted in descending order, but other embodiments are also possible.

At the receiver side, a vector signal v(t) is received, which may be an attenuated version of the original vector signal s(t). Typically the channel response is frequency selective, which may lead to inter-symbol interference ("ISI"). Furthermore, crosstalk and noise may be added to the transmitted signal, for instance, Gaussian noise.

For clarity, the description assumes that the receiver observes the received vector signal v(t) at some sampling time $t_0$ and we denote the resulting signal values by v. Sampler 180 can be a front-end sampler that samples the received vector signal y(t) at sampling time $t_0$ to generate the vector of samples v. In prior art systems with reference to FIG. 1, the sampled vector v may be further input into rank-order unit 190.

The rank-order sorting operation may determine a full ordering of the sampled values on the wires or a partial order. A full ordering would mean that all values on the n wires are sorted. A partial ordering would mean that the ordering of only a subset of the wires are determined, for example, those that carry some of the largest and some of the smallest values, which is enough when the other values are quiescent, in particular in the case of a sparse modulation code.

As an illustration of a partial sorting application, in the 8b8w signaling plotted in FIG. 1 as taught by Cronie III where the basis vector $x_0$ is defined as:

$$x_0 = [1\ 1\ 0\ 0\ 0\ 0\ -1\ -1],$$

the output of rank-order unit 190 may include four indices 195 on four wires/channels/etc. indicating the ranking of the wires where respectively the two largest (+1, +1) and the two smallest sample values (−1, −1) have been measured. Indeed, in the "8b8w" case, the four other wires' samples have a zero value and are quiescent. Possible detailed embodiments of rank-order units 190 and codeword decoder 170 have been taught in Cronie III. For instance, in some embodiments, rank-order units 190 may further include a max-detector unit to select the largest (positive) values and a min-detector unit to select the smallest (negative) values out of the n components of the sampled y vector signal.

An example of a sampled vector signal may be:

$$y = [1.1\ 0.2\ -1.3\ 0.19\ -0.9\ 0.01\ -0.3\ 1.2]$$

where the largest value 1.2 is detected on wire 8, the second largest value 1.1 is detected on wire 1, the smallest value −1.3 is detected on wire 3 and the second smallest value is detected on wire 5. The remaining elements are treated as corresponding to zero values.

Codeword decoder 170 can then reconstruct the original vector $CW_l$ as:

$$CW_l = [1\ 0\ -1\ 0\ -1\ 0\ 0\ 1]$$

Codeword decoder 170 can then further reconstruct the k output bits 145 by mapping back vector $CW_l$ into the initial representation space, by applying the reverse operation of encoder 110.

While vector signaling and vector storage schemes as taught by Cronie II, Cronie III, and/or Cronie IV already provide substantial improvements over their respective prior art, there are some applications wherein additional improvements are possible. For instance, in high-speed and/or low power communication and memory systems, it is desirable to avoid as much as possible analog-to-digital converters and/or lookup memories in designing the integrated circuit for the communication system's receive unit 140 or read decoder 250 in favor of simpler gates and components, so that the integration scale factor and power efficiency, and consequently the overall cost, can be further optimized.

A common theme in vector processing methods is that the permutation modulation methods and/or coding methods, as employed by the communication or storage system respectively, are most efficiently decoded by integrating a sorting decoder at the communication receiver or at the memory reader decoder side respectively. Embodiments of SDC 160 have been taught in Cronie III where a rank-order unit 190, 290 sorts the input signals according to their ranking, as this ranking uniquely determines the underlying codeword of the permutation modulation code associated with the analog signals transmitted over bus 130 or stored into memory cell capacitors.

A sorting decoder may determine the rank-order of its input signals, that is, an indication of the relative ranks of each input signal compared to the others. Depending on the application, full or partial sorting may be applied. Partial sorting may amount to finding some largest values and some smallest values, such as, for instance, in accordance with the teachings by Cronie III where the transmitted vector codeword is a sparse codeword, meaning that it has few non-zero coordinates, and that it is completely specified by the locations of its non-zero coordinates. In the latter application, the sorting decoder may only have to output the ranking of these positions.

High speed receiver circuits are often implemented with multiple parallel circuits, sometimes termed "phases", in order to lower the speed of the circuits in the multiple parallel phases. This parallelism allows a circuit in one of the phases to run for multiple clocks to produce a given result. It is desirable for a system architecture intended for such high speed operation to be optionally partitioned into multiple parallel phases, allowing a broader range of embodiments that trade off differing levels of complexity and performance.

As will be recognized by one skilled in the art upon reading this disclosure, various embodiments of a sorting decoder can be formed in semiconductor integrated circuits. A straightforward implementation would be to use an analog-to-digital converter ("ADC") for each input signal wire. The resolution of such an ADC may be chosen according to the vector signaling code used and/or additional processing that may be required. A sorting algorithm, a rank-order algorithm, or a look-up table memory can then be used in the digital domain for rank-ordering the resulting digitized samples. Such an implementation, however, presents substantial drawbacks in high speed communication systems such as modern chip-to-chip communications, in particular in terms of hardware integration size and power efficiency.

Prior art hardware optimization methods for chip-to-chip communication typically assume conventional signaling methods such as differential signaling rather than vector signaling. Similarly, prior art hardware optimization methods for non-volatile memory systems typically assume conventional single level or multilevel cell programming rather than vector storage. Therefore, what is needed is a sorting decoder semiconductor circuit architecture suitable to any sorting method that further optimizes the communication, respectively the memory storage system overall efficiency, beyond the substantial functional improvements brought by vector signaling, respectively vector storage methods.

In accordance with at least one embodiment of the invention, any suitable permutation sorting methods may be utilized. In accordance with at least one embodiment, techiques described herein can apply to any suitable communication or storage methods requiring sorting of the transmitted or stored physical signals to decode the corresponding digital information. In this disclosure, we refer collectively to the corresponding decoding methods as "sorting decoding" methods.

Voting Circuits

Voting circuits are useful in several applications. One notable application is in receivers that can detect vector signaling codes, as one example, the 8b8w vector signaling code taught by Cronie III. The 8b8w code sends coded words over 8 wires, encoded in three levels, as examples, plus, zero and minus. One 8b8w code, hereinafter denoted as the (2,4,2)-code, sends two of the eight wires at a plus level, four at a zero level, and two at a minus level. The receiver for such a data link has the task of determining which of the wires carry what was transmitted at a plus level, and which of the wires carry what was transmitted at a minus level, often in the presence of common mode noise. Because of this noise, the detection is optimally carried out by a voting circuit that determines what was transmitted to each input solely by comparison to the other inputs rather than by comparison to a fixed reference. An input gets "votes" in said voting circuit by winning a comparison against the other inputs, for example by having a higher voltage or current level as compared to another input. In the example of the described 8b8w code, the two inputs with the most "votes" are declared to be at the plus level, the two inputs with the least "votes" are declared to be at the minus level.

Figure 2:
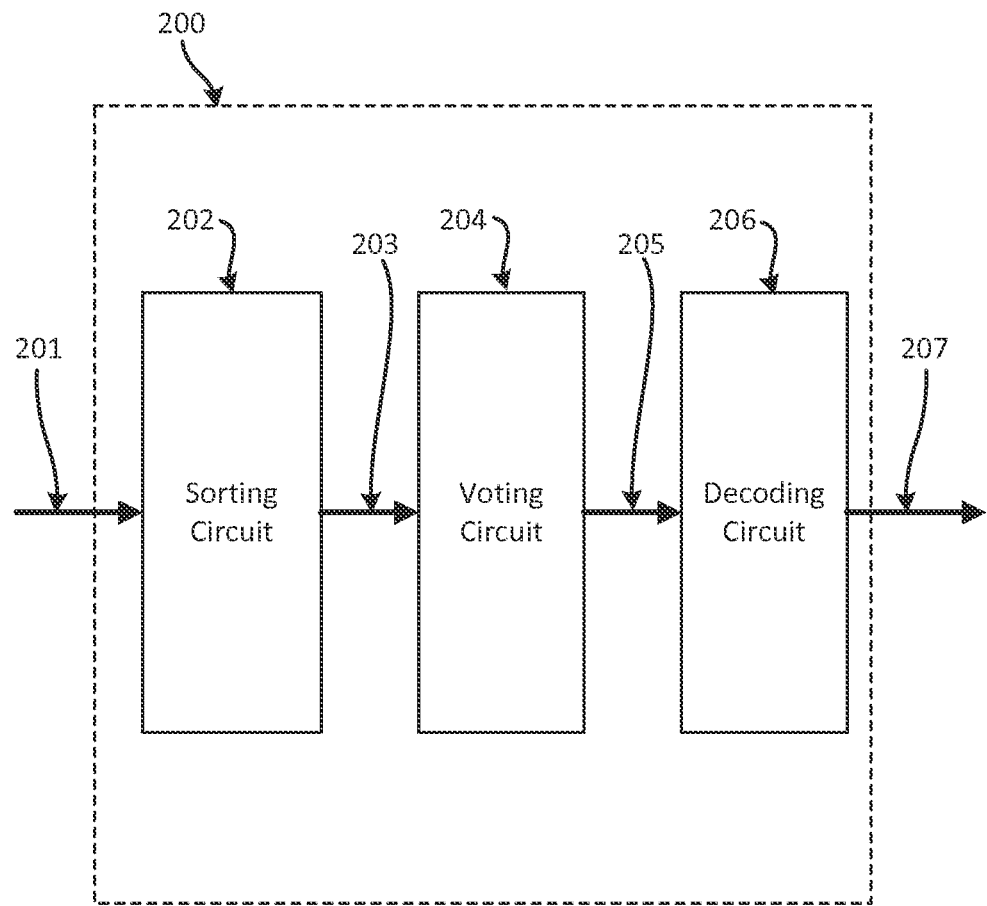
FIG. 2 is a schematic diagram of a vector signal decoder in accordance with at least one embodiment of the invention.

As shown in FIG. 2, a vector signaling code decoder 200 receives an input vector signaling code 201. Input values of the vector signaling code 201 are ranked by sorting circuit 202, with ranked results 203 designated by voting circuit 204 as representing particular code elements of the vector signaling code 205. In accordance with at least one embodiment of the invention, the sorting circuit 202 may include a crossbar switch and one or more comparators configured to rank at least a subset of values of the input vector signaling code 201. Decoding circuit 206 translates particular code elements 205 into a decoded vector signaling code result 207.

Crossbar-Based Tiled Sorting Network Decoder

Cronie I and Cronie II describe decoders based on an abstract sorting network element. In accordance with at least one embodiment, a high speed tile may serve as an element of such sorting networks and network based decoders. An "m×m tile" is an element that has m inputs and m outputs, and who's output is the sorted version of the m input values.

Figure 3:
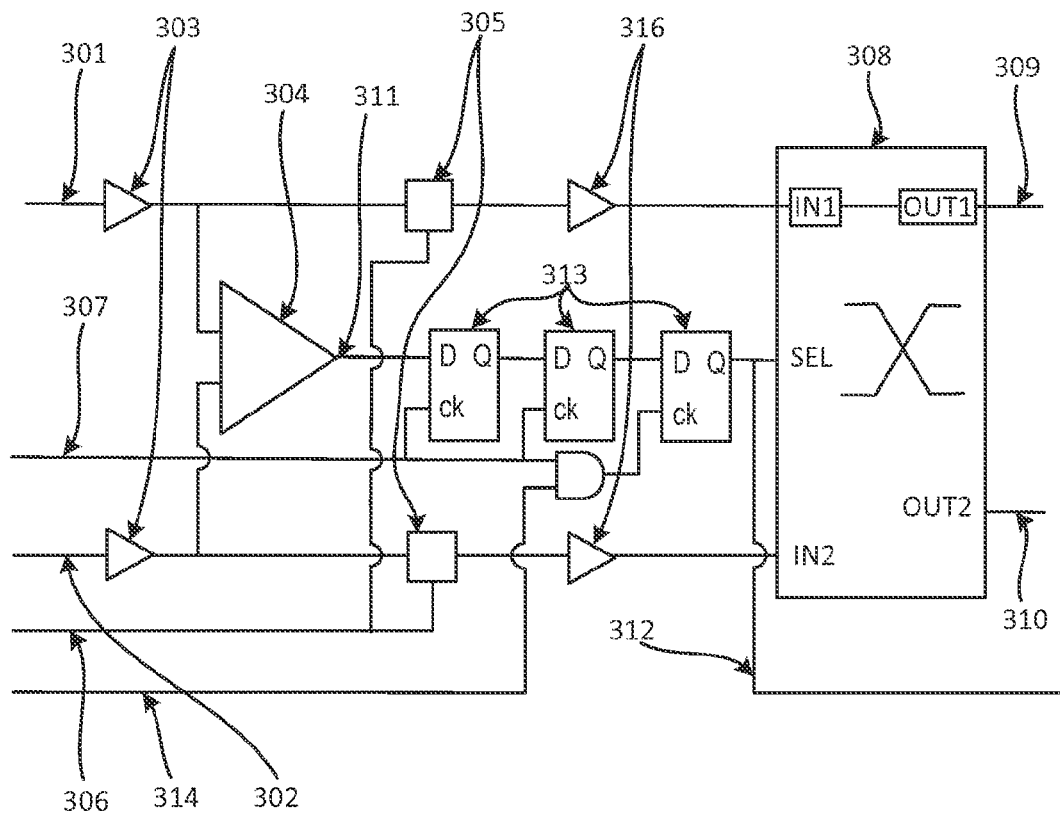
FIG. 3 is a circuit diagram for one 2×2 crossbar tile of a sorting network in accordance with at least one embodiment of the invention.

FIG. 3 describes the details of an example 2×2 tile. Inputs 301 and 302 represent two analog signal inputs from a signal source or previous stage. These signals are buffered by unity gain amplifiers 303, and compared by differential comparator 304 producing a difference result 311. The buffered signals are also captured by sample-and-hold units 305 controlled by digital signal 306, with the captured outputs further buffered by unity gain amplifiers 316, then becoming inputs to the 2×2 switching element 308.

If input 301 is greater than input 302 (as an example, more positive) the difference result 311 will be true. In a practical circuit, the differences between inputs may be very small, possibly influenced by signal noise, and the difference result may therefore be unstable in both value and in decision time. Thus, digital flip-flops or latches 313 are used to freeze and retime difference result 311 using clock 307 to eliminate metastability and obtain a stable decision result 312 under the control of clock enable 314. The use of cascaded flip-flops or latches in this manner for metastability protection is well known in the art, with the required number of stages of digital flip-flops or latches 313 and the rate of clock 307 being determined by that common practice.

The stable decision result 312 controls the select input of the 2×2 crossbar switching element 308, with a true select input causing IN1 to connect to OUT1, and IN2 to connect to OUT2, while a false select input causes IN1 to connect to OUT2, and IN2 to connect to OUT1. Thus, the tile output 309 will always correspond to the greater (as an example, more positive) of inputs 301 and 302, and the tile output 310 will always correspond to the lesser (as an example, less positive) of inputs 301 and 302. The stable decision result 312 identifies which of the two inputs 301 and 307 was greater.

Figure 4:
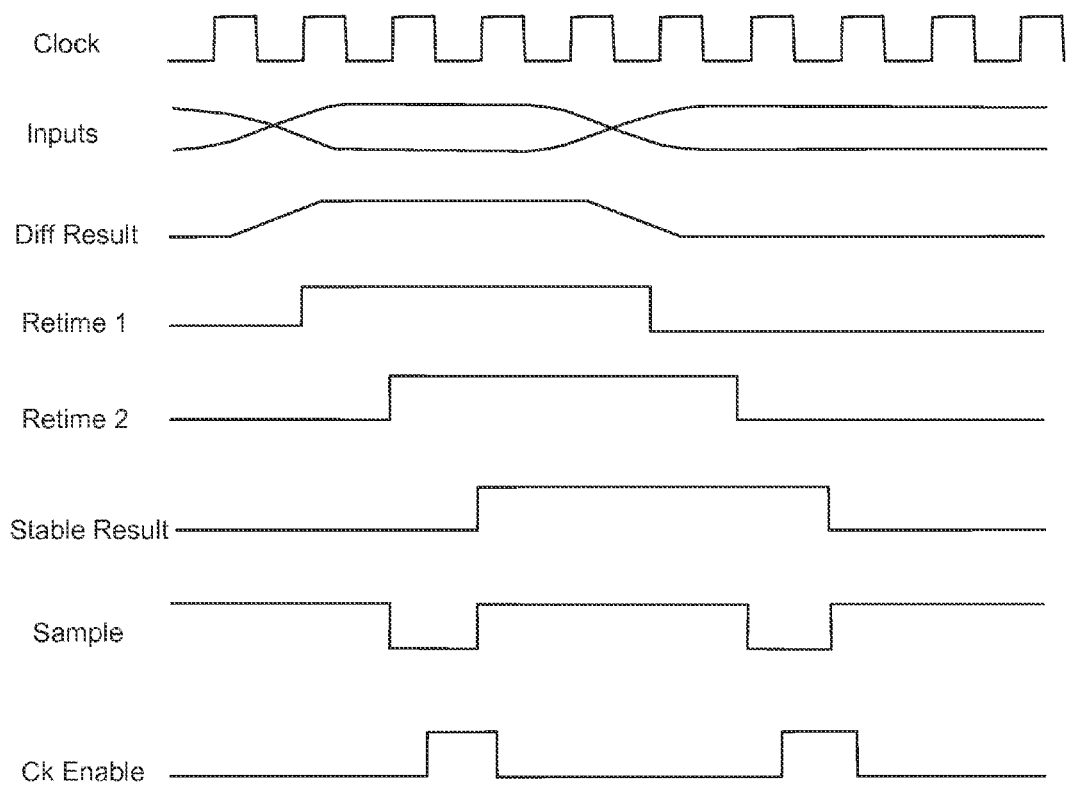
FIG. 4 is a timing diagram of the operation of a 2×2 crossbar tile in accordance with at least one embodiment of the invention.

Each tile's sample-and-hold circuit makes a delayed duplicate of the voltage level of its analog signal inputs. The sample-and-hold is a classic circuit including a pass transistor and a capacitor, controlled by the tile input signal Sample 306. In accordance with at least one embodiment of the invention, this Sample signal may be advanced one-half clock for each stage of the sorting network, to compensate for the finite sample acquisition time of such analog circuits, as may be seen in the example timing diagram of FIG. 4.

The unity gain amplifiers 303 provide isolation for the analog signals from the capacitive loading effects of the sample-and-hold 305. Similarly, unity gain amplifiers 316 isolate the sample-and-hold output from the capacitance and potential for transient signal cross-connect within crossbar switch 308. This isolation eliminates sources of signal degradation and amplitude reduction, which may lead to erroneous results as tiles are cascaded into larger configurations. In accordance with at least one embodiment of the invention, buffering may be integrated with other circuit elements, and/or compensation may be provided for capacitive loading effects by use of charge-balancing methods as are commonly used with dynamic logic design.

In accordance with at least one embodiment of the invention, an additional power gating control signal to turn supply current off to the differential amplifier during the part of the circuit when it is not in use may be incorporated, reducing power consumption and eliminating a source of transient noise.

Sorting Networks Using the Tile Element

The 2×2 tile can be combined in several useful ways to form sorting networks of the type used in the examples of Cronie I and Cronie II.

Figure 5:
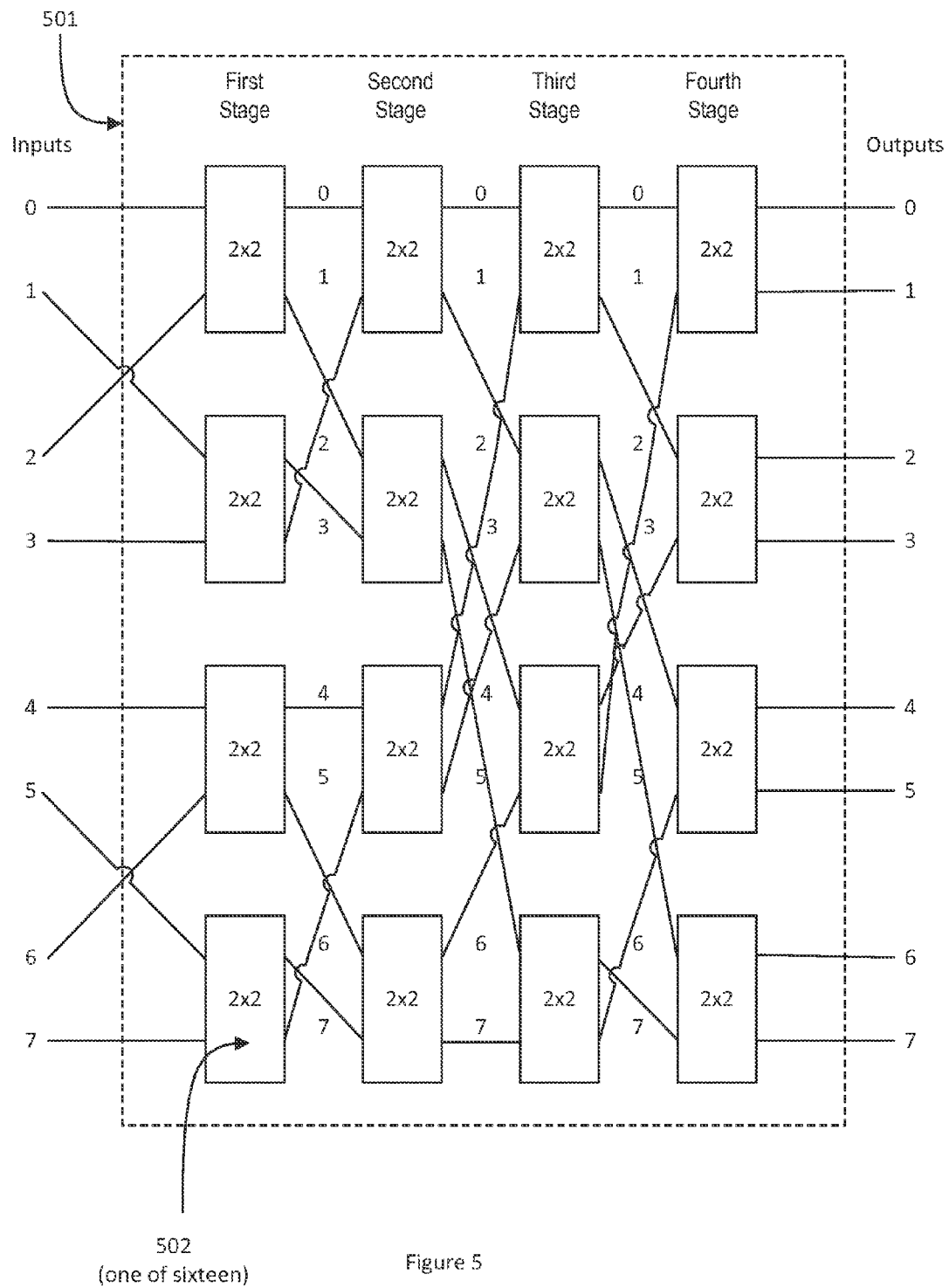
FIG. 5 is a schematic diagram illustrating 2×2 crossbar tiles configured as an array of 16 tiles to sort eight inputs in accordance with at least one embodiment of the invention.

An example of an eight signal sorting network in accordance with at least one embodiment of the invention is shown in FIG. 5. It includes sixteen 2×2 tiles as shown in FIG. 3 (e.g., the 502), organized as four stages of sorting operations with each stage including four 2×2 tiles. The signals entering each stage as inputs from the data source or previous stage and exiting as connections to the subsequent stage or output results may be identified as signals 0 through 7, as shown in FIG. 5. At each stage, the 2×2 tiles may be connected such that the following comparisons are made:

FIRST STAGE: 0 AND 2, 1 AND 3, 4 AND 6, 5 AND 7.
SECOND STAGE: 0 AND 3, 1 AND 2, 4 AND 7, 5 AND 6.
THIRD STAGE: 0 AND 4, 1 AND 5, 2 AND 6, 3 AND 7.
FOURTH STAGE: 0 AND 5, 1 AND 4, 2 AND 7, 3 AND 6.

Several equivalent wirings exist that will produce the same result, for example by reversing the order of the pairs of comparisons or the order within each pair. The described interconnection method may also be extended to utilize larger arrays of tiles to sort wider data sets.

Figure 6:
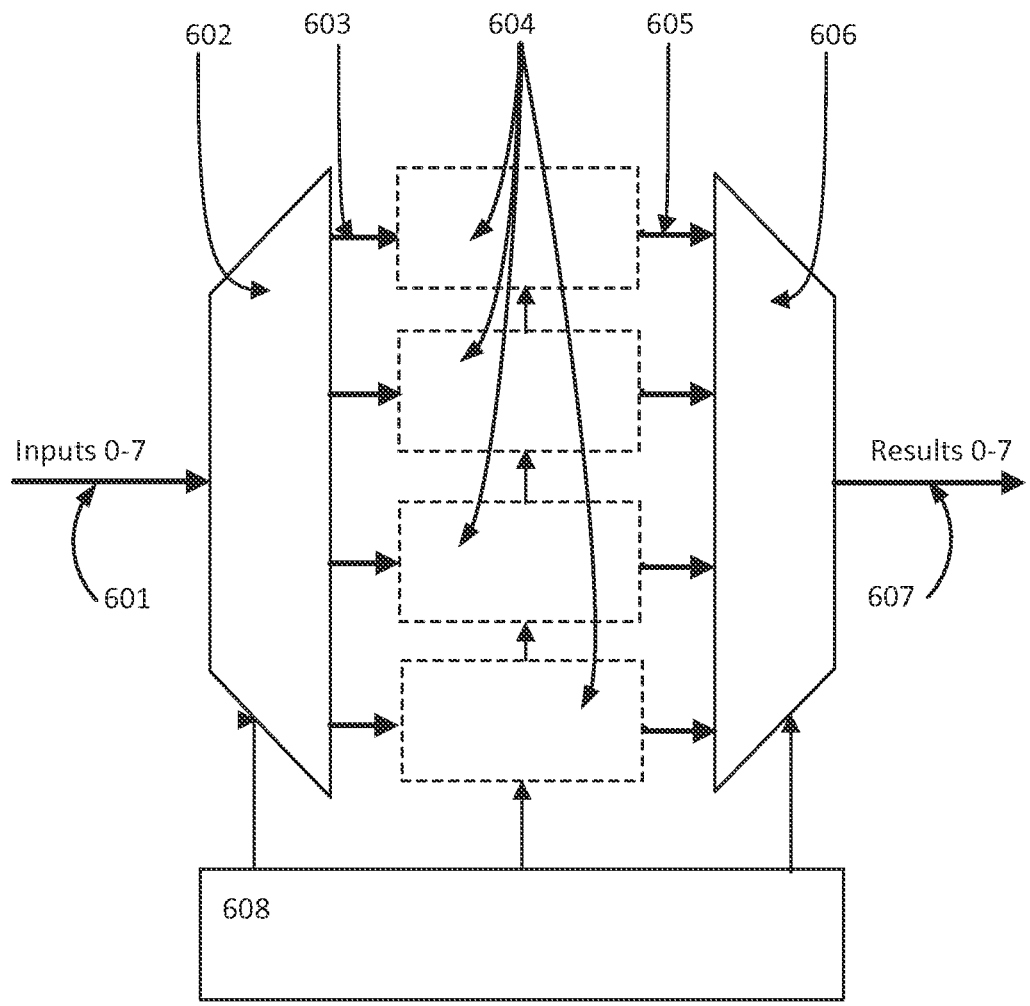
FIG. 6 is a schematic diagram illustrating multiple instances of a sorting array operating in multiple phases to increase performance in accordance with at least one embodiment of the invention.

If the sorting network of FIG. 5 does not provide sufficient throughput, multiple instances may be operated as parallel phases. FIG. 6 shows an example in accordance with at least one embodiment of the invention that uses 64 tiles in a four phase configuration. Each of the phases 604 includes the four stage, four tile sorting network 501 depicted in FIG. 5. Consecutive input sets 601 are sequentially assigned by a distributor 602, becoming inputs 603 to each phase sorting network 604. On completion, the results of each phase 605 are sequentially multiplexed 606 into a result stream 607. Overall operation is scheduled and managed by controller 608, which connects to and controls distribution 602, result multiplexing 606, and the operation of each sorting phase 604.

Further examples in accordance with at least one embodiment of the invention include 48 tiles in a three-phase configuration, or 128 tiles in an eight phase configuration, with each phase using the same 16 tile sorting network and the overall design differing in the degree of distribution of input values and subsequent consolidation of results to the multiple phases. The number of phases is chosen based on the total throughput required of the sorting system and the total processing time required by each sorting network.

4×4, Six Comparator Tile Crossbar-Based Multi-Pass Decoder

Figure 7:
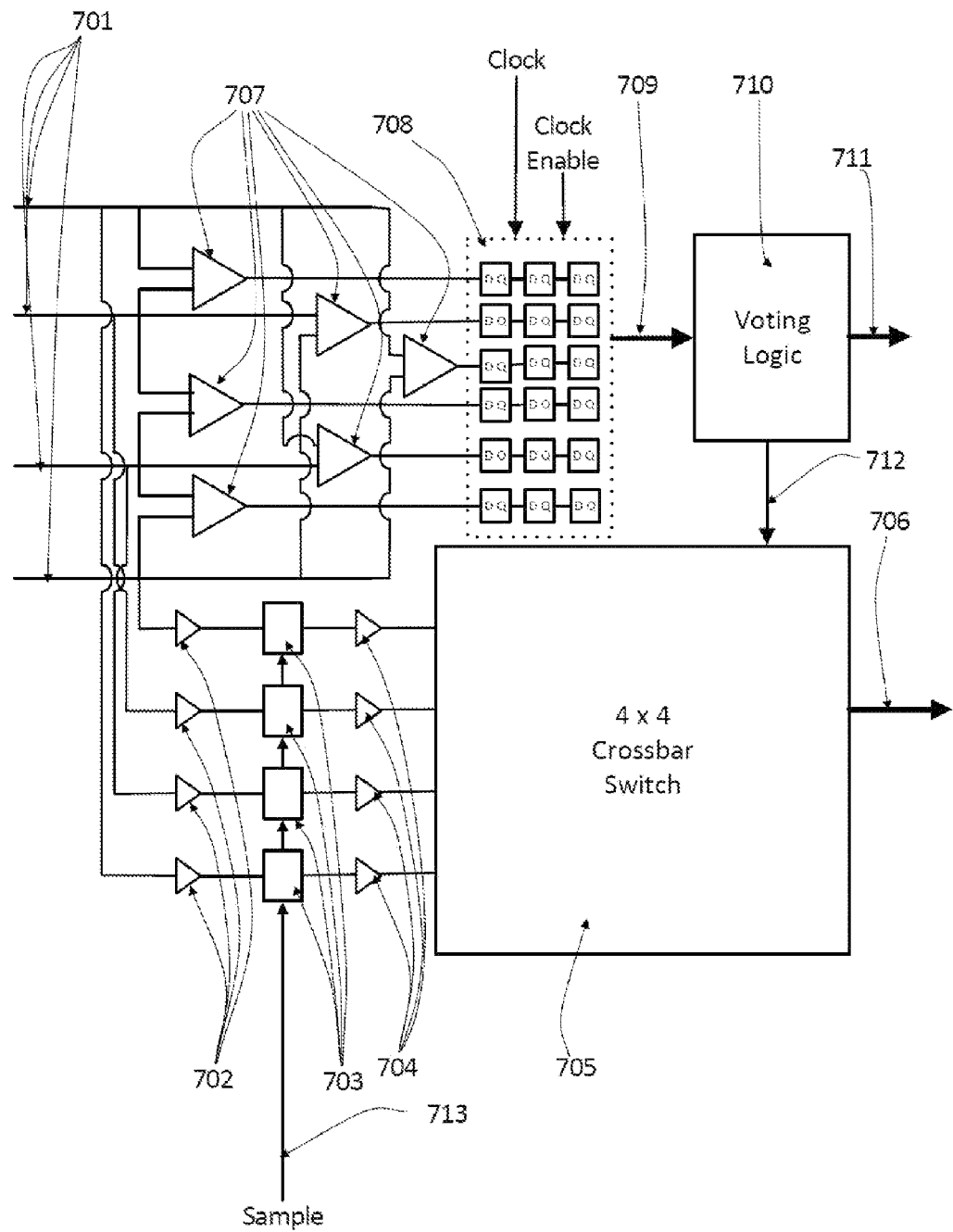
FIG. 7 is a circuit diagram for one 4×4 crossbar tile of a sorting network in accordance with at least one embodiment of the invention.

A useful 4×4 tile similar to the 2×2 tile may be constructed as illustrated in FIG. 7. The fundamental operation is similar to that of the 2×2 tile.

Comparators 707 make six possible comparisons among the four input signals 701. The comparators are connected to every combination of two of the inputs, namely across inputs (0 and 1), (0 and 2), (0 and 3), (1 and 2), (1 and 3) and (2 and 3). As described in the earlier example, these difference results may be unstable in both value and in decision time, so that a retiming element 708 is used to produce stable decision results 709 as inputs to the voting logic 710. As with the previous example, the retiming element may include multiple flip-flops or latches that synchronize the difference results to the provided clock and eliminate any metastability caused by transitions or indeterminate levels. A clock enable may be used on the final synchronization stage of the retiming element to control transitions entering voting logic 710. The voting logic 710 produces a rank order from the stable decision results 709, which is represented in the digital results output 711, and as the control signals 712 for crossbar switch 705. The six comparisons may resolve to an unambiguous rank ordering, however input noise may cause the comparisons to be made in a circular manner. In these situations, the rank order is determined either by input or output number or randomly. In accordance with at least one embodiment of the invention, the rank order in this situation is determined by input order.

Concurrently, the four input signals 701 are buffered by unity gain amplifiers 702 which isolate the inputs from the capacitive loading effects of sample and hold 703. Under control of the Sample signal 713 connecting to each of the sample and holds 703, a stable representation of input levels is captured. Buffers 704 again provide isolation from the capacitive load and potential transient cross-connects of crossbar switch 705. Under control of voting logic 710, crossbar switch 705 is configured to connect the sample and hold outputs representing inputs 701 into the desired sorted order for output as analog outputs 706 from the 4×4 tile element.

Another useful example in accordance with at least one embodiment of the invention is a 3×3 tile element, which is a subset of the described 4×4 tile. It incorporates three analog inputs, three comparators, three sample-and-hold elements, and a 3×3 crossbar switch. Similarly, other examples in accordance with at least one embodiment of the invention may extend the design to incorporate N>4 inputs, $N*(N-1)/2$ comparisons, an N×N analog crossbar switch, etc. However, the rapidly increasing number of comparators and crossbar elements required for significantly larger N may make such designs impractical.

Sorting networks may be produced using these tile elements, in the same manner as shown using 2×2 tiles. The increased complexity of the larger tiles may be mitigated by the wider sorted results they produce, which may reduce the need for additional intermediate sorting stages in the larger sorting network.

Crossbar-Based Multi-Pass Decoder

Another example in accordance with at least one embodiment of the invention uses a generalized and typically large crossbar switch to implement a multi-pass decoder for an ensemble coded link.

The following definitions are used in the descriptions. The circuit has W wires of input and a collection of one or more comparators with L legs as their inputs. Said comparator collection is composed of C comparators with each comparator connected to two out of the L legs. The number of comparators is variable and depends on relative costs of the components. One useful value of C is equal to the number of unique pairwise combinations of L, as represented by the earlier described tile examples. However, as will be subsequently described, other values are also useful and may be advantageous in terms of cost and complexity.

Each input is considered to represent one element of a multi-level code with N levels. One such code is an N=3 or three-level code, also known as a ternary code. The levels of a ternary code may be named, as examples, Plus, Zero, and Minus. A vector signaling code having W elements of N levels is placed onto the W wires. The vector signaling code utilizing a ternary line code can be described as having M inputs at a Minus level, Z inputs representing a Zero level, and P inputs at a Plus level. The 8b8w code of Cronie III is one example of a ternary code, which may be described as having M=2, Z=4 & P=2.

Figure 8:
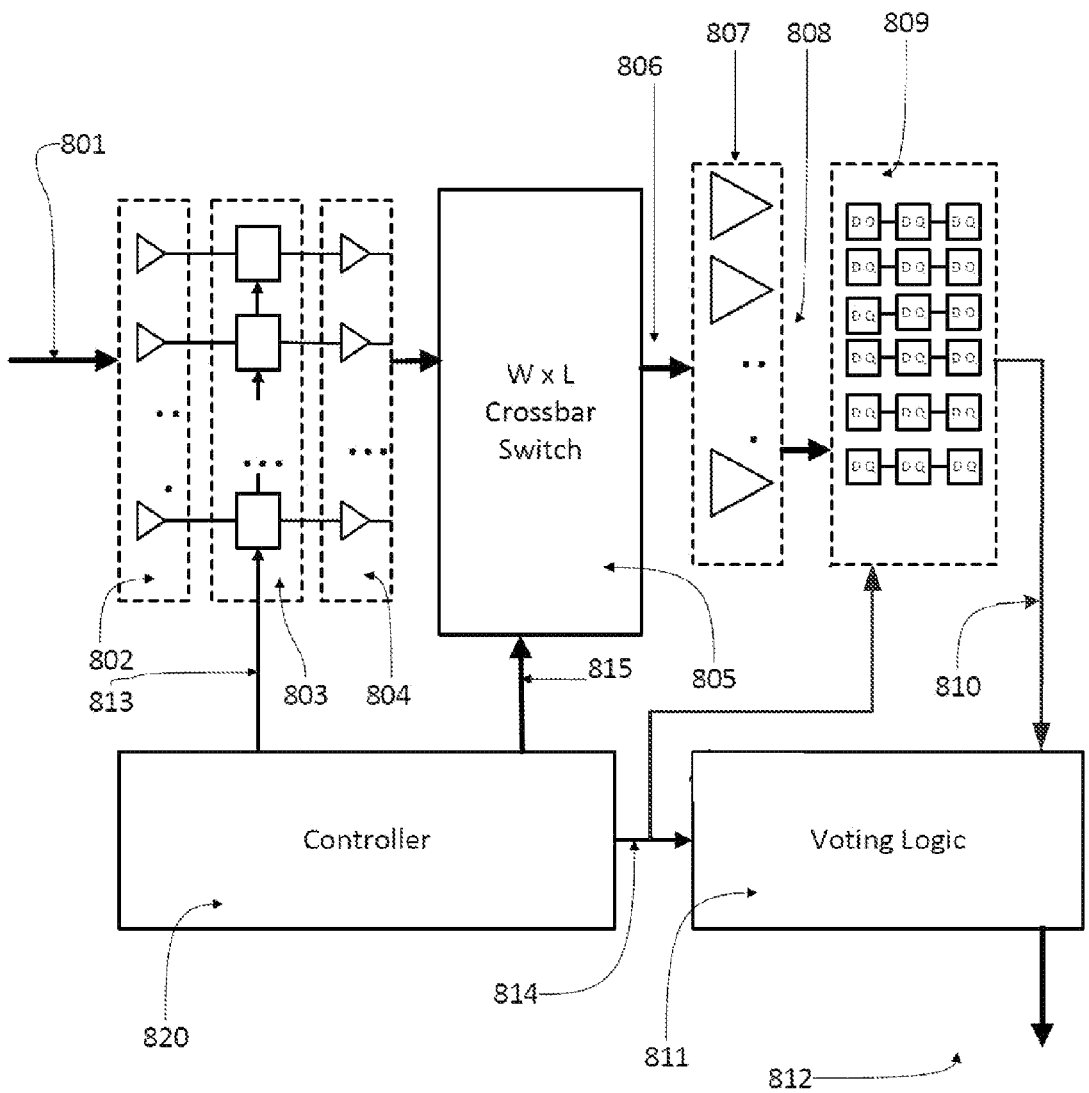
FIG. 8 is a circuit diagram for a crossbar-based multi-pass decoder in accordance with at least one embodiment of the invention.

One example in accordance with at least one embodiment of the invention associates this 8b8w code with a voting logic decoder based on the parameters W=8, L=4 and C=6. As illustrated in FIG. 8, a W×L crossbar switch 805 allows a subset of L wires 806 to be selected from the W inputs 801 and connected to the inputs of the collection of C comparators 807 under the control of a controller circuit 820. This crossbar switch may function as a break before make circuit, so that the crossbar inputs are not disturbed by transient cross-connections during crossbar switching changes. The controller orchestrates the interplay of the circuit components (e.g., with signals 813, 814 and 815), and can be implemented in any of a hardware state machine, a programmable state machine, or a microprocessor. In accordance with at least one embodiment of the invention, the controller circuit 820 may correspond to and/or incorporate a sequencer configured to sequence and/or schedule activities of other components depicted in FIG. 8.

Additional elements of this example include W unity-gain buffer amplifiers 802, W sample-and-holds 803, and W additional unity-gain buffer amplifiers 804. As previously described, the sample-and-hold circuits insure that signal levels do not change for the duration of the computation, and the buffer amplifiers isolate signal inputs from the capacitive loading of the sample-and-hold, and the sample-and-hold signal from capacitive loading effects of the crossbar switch. In accordance with at least one embodiment of the invention, some or all of buffers 802 and 804 may not be required.

The circuit also employs a retiming circuit 809 which samples the output of the comparators 808 with a receive clock. Since the inputs to a given comparator may be identical or substantially identical, in accordance with at least one embodiment of the invention, these comparator outputs may be retimed to minimize the occurrence of a meta-stability event when a comparator output does not settle into a stable state or valid logic level. Depending on clock speed and logic family, up to three levels of retiming flip-flops or latches may be required in circuit 809, as is common practice for meta-stability mitigation.

The circuit employs a rank ordering or voting logic circuit 811 that transforms the output of the C comparators 810 into the rank order of the L inputs by counting the number of favorable comparisons to generate a ranked output 812. The L inputs are put in the order of the number of votes received. That rank order is referred to as R.

Figure 12:
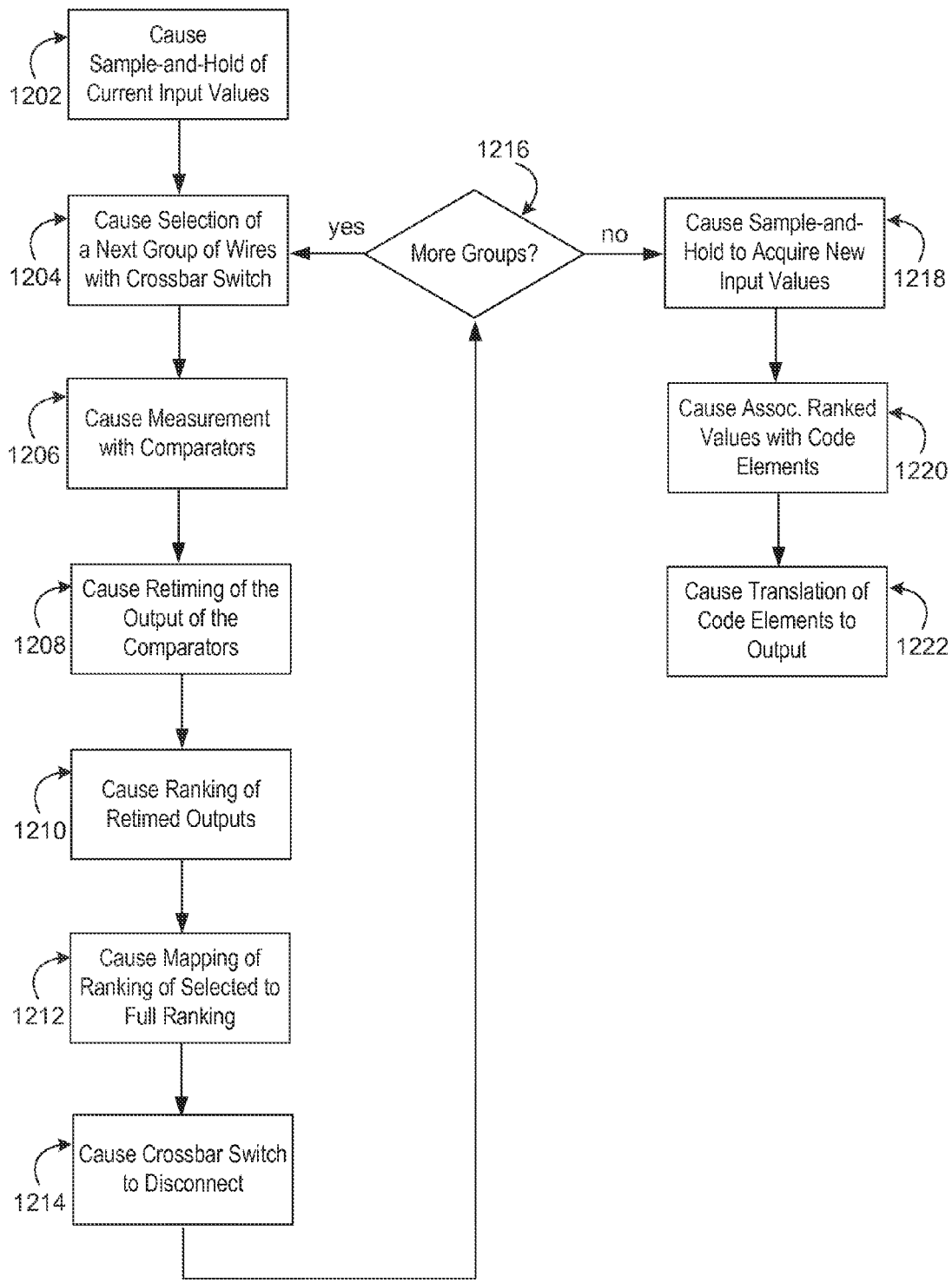
FIG. 12 is a flowchart depicting example steps in accordance with at least one embodiment of the invention.

In accordance with at least one embodiment of the invention, the controller 820 may perform and/or cause to be performed the following example procedure (depicted in FIG. 12):

Set the input sample-and-hold circuit to hold the current input values (step 1202).

Program the crossbar switch to select a first group of L wires out of the W inputs (step 1204).

After the crossbar connection is made, make a measurement using the C comparators (step 1206).

Retime the output of the C comparators (step 1208).

Convert the retimed C outputs of the comparators into a rank order representation R of the L inputs that were measured (step 1210).

Map the R rank order representation of the L inputs back into a rank order representation of the W inputs by reversing the logical mapping used to program the crossbar switch (step 1212).

Program the crossbar switch to disconnect all wires from all inputs ("break-before-make," step 1214).

Repeat the selection and measurement by returning to step 1204 to obtain a different set of inputs, until enough measurements have been made to be able to divide each of the W inputs into the N levels of the multi-level code (step 1216).

Release the input sample-and-hold circuit to allow new inputs to be acquired (step 1218).

Output the final ranking or decoding. For example, steps 1202-1218 may be performed as part of ranking at least a subset of values of a vector signaling code. At step 1220, the ranked values may be associated with corresponding code elements. At step 1222, the code elements may be translated into a decoded vector signaling code result.

Four Cycle 8b8w Voting Circuit

In accordance with at least one embodiment of the invention, the combination of elements meets the conditions:

$L/2 >= M;$ $L/2 >= P;$ $W = 2*L;$ $N = 3;$ and $C = L*(L-1)/2 =$ (all pairwise combinations of $L$).

A decoder for the 8b8w code meets these conditions if M=2, P=2, L=4, W=8, N=3, and C=6. In this case, the computation can be completed in four cycles.

In the first measurement cycle, half of the members of W are selected by the switch for connection to the L inputs of the comparator collection. The comparisons are made and retimed.

In the second measurement cycle, the members of W that were not selected in the first cycle are selected by the crossbar and connected to the L inputs of the comparator collection. Again, the comparisons are made and retimed.

Logically, the computation is a two stage calculation involving 2*C comparators in each stage. For the case of 8b8w, it is a logical two stage calculation involving 12 comparators in each stage for a total of 24 comparisons.

For this special case, in accordance with at least one embodiment of the invention, those members of W that are at a Minus level, are in the collection of the lower half of the R for one or the other of the two measurements. Also, the members of W who are at a Plus level are in the collection of the upper half of the R for one or the other of the two measurements.

A third round is initiated where the members of W corresponding to the lower half of the R for each of the two measurements are selected by the controller circuit. The comparison is made. The lower M values of the R of this measurement correspond to the members of W that have a Minus level. The actual members of W that are minus are determined by remapping the lowest M values of R to the members of W that they derive from based on the setting of the crossbar switch.

A fourth round is initiated where the members of W corresponding to the upper half of the R for each of the two measurements are selected by the controller circuit. The comparison is made. The upper P values of the R of this measurement correspond to the members of W that have a plus value. The actual members of W that are Plus are determined by remapping the highest P values of the R to the members of W that they derive from based on the setting of the crossbar switch.

Figure 9:
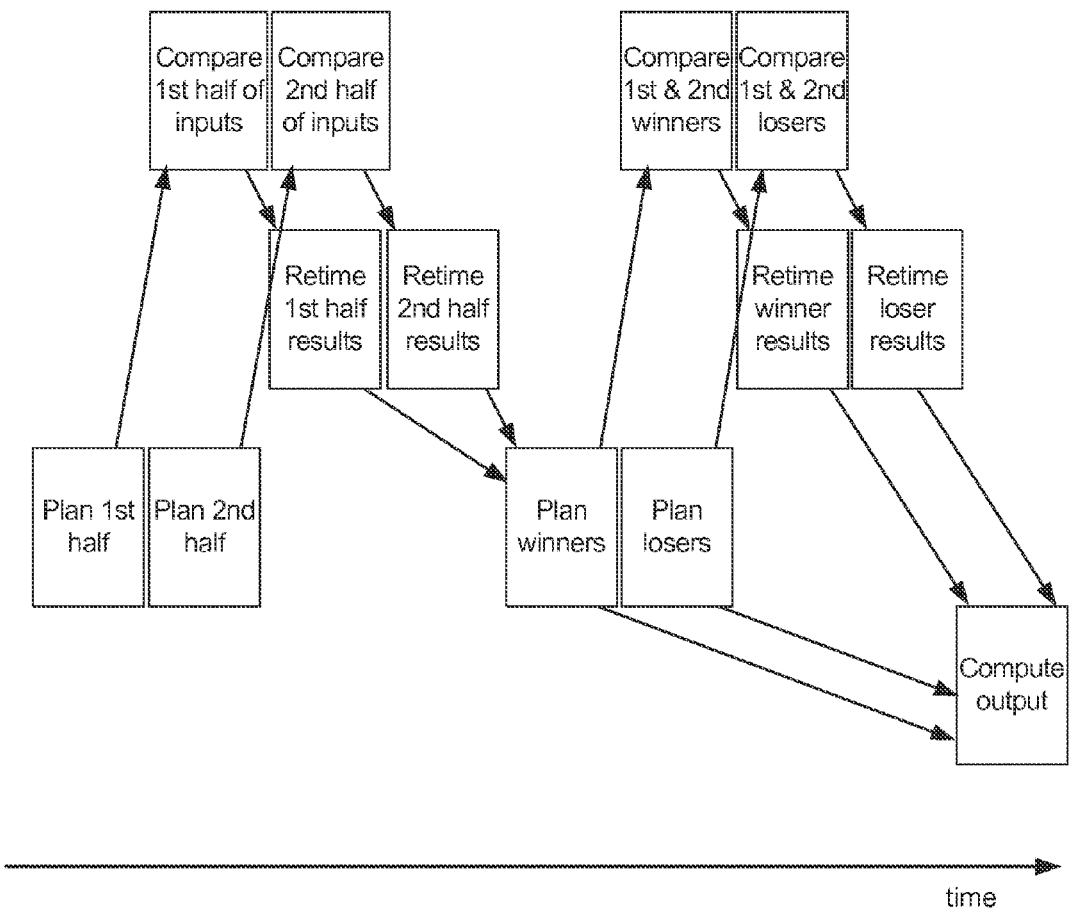
FIG. 9 is a timing diagram for the case of a four cycle computation using the circuit of FIG. 8 in accordance with at least one embodiment of the invention.

At the completion of these four cycles of measurement, the level of each member of W has been determined. FIG. 9 shows the corresponding timing diagram.

Pipelined Timing

The retiming circuit can be pipelined with the comparison circuit if the controller circuit does not need the results immediately. In the specific example discussed above, the retiming can be pipelined after the first comparison because the results of the first comparison are not needed until the results of the second comparison are complete. The retiming can be pipelined after the third cycle because the fourth cycle is not dependent on the calculation done in the third. The fourth cycle can also be pipelined because a group of measurements on another set of samples can be started after the fourth measurement.

Figure 10:
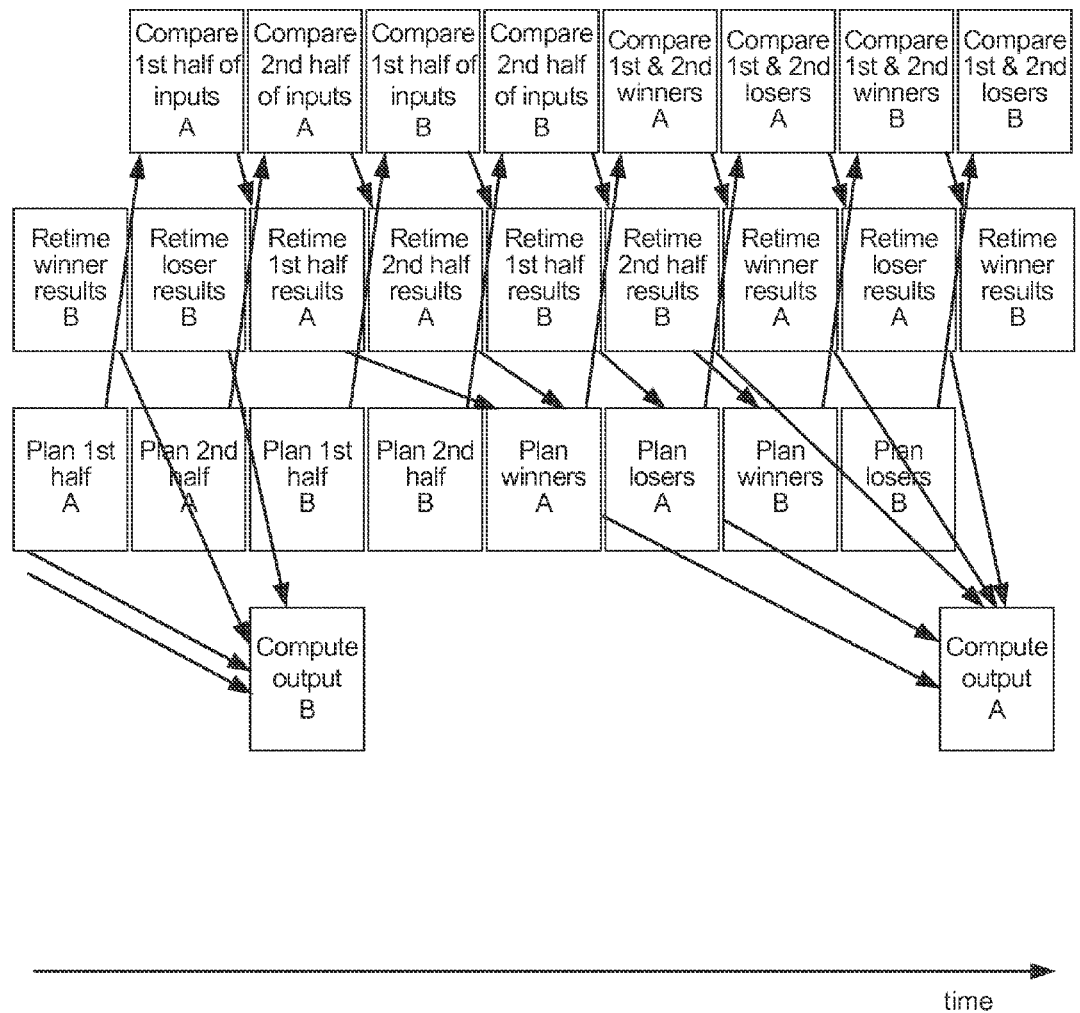
FIG. 10 is a timing diagram for the circuit of FIG. 8 where interleaved pipelining is used to allow overlap of the measurement and retiming operations in accordance with at least one embodiment of the invention.

A special pipelining case is when a single crossbar switch and comparator is used to calculate two sets of input values in interleaved fashion. In accordance with at least one embodiment of the invention, the crossbar switch is of size 2W×L in order to be able to switch the values from two samples, and two values are calculated in 8 cycles, as illustrated in the timing diagram of FIG. 10.

Specific Decoders

FIG. 11 lists a number of decoders that can be made using crossbar switch based voting circuits and/or tile based voting circuits. The notation used in the table of FIG. 11 for the comparators is as follows: Stage:($1^{st}$ input to be compared-$2^{nd}$ input to be compared), ($3^{rd}$ input to be compared-$4^{th}$ input to be compared), . . . ; Stage:( . . . .

In this table, the codes are obtained as the distinct permutations of the vector given in the column entitled "Code levels." In the column entitled "Comparators Needed", the entries marked "Full" means that a comparator exists for every combination of 2 of the inputs. For example for the 2.5b4w wire code which is the first entry in FIG. 11, "Full" means: $1^{st}$:(0-1), (0-2), (0-3), (1-2), (1-3), (2-3).

Numerous other decoders exist that are transformations of the decoders listed in FIG. 11. For example, in the 4 stage version of the 4b5w decoder of FIG. 11, the order of the $2^{nd}$ and $3^{rd}$ stage can be reversed. Similarly, different sized tiles may be used, some independent comparison operations described as occurring in different stages may be performed simultaneously, and different degrees of pipelined timing may be applied. The described methods and circuits may also be applied to codes of other lengths, derived from other base vectors, and/or incorporating different sets of allowed values.

The examples illustrate the use of vector signaling codes for point-to-point wire communications. However, this should not been seen in any way as limiting the scope of the described invention. The methods disclosed in this application are equally applicable to multipoint communications, other communication media including optical and wireless communications, and volatile and non-volatile storage devices. Thus, descriptive terms such as voltage or signal level should be considered to include equivalents in other measurement systems, such as optical intensity, RF modulation, stored charge, etc. As used herein, the term physical signal includes any suitable behavior and/or attribute of a physical phenomenon capable of conveying information. In accordance with at least one embodiment of the invention, physical signals may be tangible and non-transitory.

While the present invention has been primarily disclosed in the framework of vector processing methods, it will be evident to one skilled in the art that it also applies to prior art permutation sorting methods. More generally, the present invention may apply to any communication or storage methods requiring sorting of transmitted or stored physical signals to decode the corresponding digital information.

The preferred embodiments described here include the best mode known to the inventors. Further embodiments can be envisioned by one of ordinary skill in the art after reading this disclosure. Other embodiments, combinations, or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using analog or digital hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

The use of the terms "a" and "an" and "the" and similar referents in the context of describing embodiments (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

What is claimed is:

1. A vector signaling code decoder comprising:
   a sorting circuit including a crossbar switch and one or more comparators configured to rank at least a subset of values of an input vector signaling code, wherein the comparators are further configured to perform pairwise comparisons among at least the subset of the values of the input vector signaling code;
   a voting circuit configured to designate ranked values as representing particular code elements; and
   a decoding circuit configured to translate sets of particular code elements into a decoded vector signaling code result.

2. The decoder of claim 1, wherein the input vector signaling code is sparse.

3. The decoder of claim 1, wherein the input vector signaling code is balanced.

4. The decoder of claim 1, wherein the values of the input vector signaling code correspond to ternary values.

5. The decoder of claim 1, wherein the one or more comparators perform pairwise comparisons among the values of the input vector signaling code.

6. The decoder of claim 1, wherein the ranking produced by the sorting circuit is of fewer than all of the values, and the choice of vector signaling code permits decoding to obtain the vector signaling code result.

7. The decoder of claim 1, wherein the subset of the values is selected by the crossbar switch.

8. The decoder of claim 7, wherein selection of subsets of values is controlled by a sequencer.

9. The decoder of claim 8, wherein the sequencer is a programmed controller.

10. The decoder of claim 8, wherein the sequencer is a finite state machine.

11. The decoder of claim 8, wherein the sequencer is a computer executing a software program.

12. The decoder of claim 8, wherein the selection and comparison operations are interleaved.

13. The decoder of claim 8, wherein the selection and comparison operations are pipelined.

14. The decoder of claim 1, further comprising a sample and hold circuit.

15. The decoder of claim 1, further comprising one or more unity gain buffering amplifiers.

16. The decoder of claim 1, further comprising a metastability-reducing retiming circuit on the output of the one or more comparators.

17. The decoder of claim 1, further comprising additional sorting circuits operating in parallel to obtain increased throughput or speed.

18. A method for vector signaling code decoding, the method comprising:

ranking, with a sorting circuit including a crossbar switch and one or more comparators, at least a subset of values of a vector signaling code wherein the comparators perform pairwise comparisons among at least the subset of the values of the input vector signaling code;

associating, with a voting circuit, the ranked values with corresponding code elements; and translating, with a decoding circuit, the code elements associated with the ranked values into a decoded vector signaling code result.

19. A vector signaling code decoder comprising:

a sorting circuit including a crossbar switch and one or more comparators configured to rank at least a subset of values of an input vector signaling code;

a voting circuit configured to designate ranked values as representing particular code elements;

a decoding circuit configured to translate sets of particular code elements into a decoded vector signaling code result; and a power gating circuit applied to each of the one or more comparators.

* * * * *